Aug. 31, 1948. H. L. RAWLINS ET AL Re. 23,033

CIRCUIT INTERRUPTER

Original Filed Jan. 16, 1941 3 Sheets-Sheet 1

WITNESSES:
E. F. Oberheim
R. T. Stratton

INVENTORS
Herbert L. Rawlins &
James M. Wallace.
BY
F. W. Lyle
ATTORNEY

Aug. 31, 1948. H. L. RAWLINS ET AL Re. 23,033

CIRCUIT INTERRUPTER

Original Filed Jan. 16, 1941 3 Sheets-Sheet 2

WITNESSES:
E. F. Oberheim
A. T. Stratton

INVENTORS
Herbert L. Rawlins &
James M. Wallace.
BY
F. W. Lyle.
ATTORNEY

Aug. 31, 1948. H. L. RAWLINS ET AL. Re. 23,033

CIRCUIT INTERRUPTER

Original Filed Jan. 16, 1941 3 Sheets-Sheet 3

WITNESSES:
E. F. Oberheim. 6
A. T. Stratton

INVENTORS
Herbert L. Rawlins &
James M. Wallace.
BY
F. W. Lyle.
ATTORNEY

Reissued Aug. 31, 1948

Re. 23,033

UNITED STATES PATENT OFFICE 23,033

CIRCUIT INTERRUPTER

Herbert L. Rawlins, Edgewood, and James M. Wallace, East McKeesport, Pa., assignors to Westinghouse Electric Corporation, East Pittsburgh, Pa., a corporation of Pennsylvania Original No. 2,405,606, dated August 13, 1946, Serial No. 374,685, January 16, 1941. Application for reissue August 14, 1947, Serial No. 768,638

48 Claims. (Cl. 200—89)

This invention relates generally to circuit interrupters, and more particularly to circuit breakers and their operating mechanisms.

This invention is especially adapted for use in small reclosing circuit breakers wherein it has certain particular novel cooperation providing certain novel and useful results, however it should be understood that many features of this invention are capable of use with other types of circuit breakers and even with other types of apparatus.

In automatic reclosing circuit breakers, it is sometimes desirable to have varying trip characteristics. Thus it is desirable in certain instances to provide for relatively quick first opening, and a slower second opening to obtain better coordination with fuses when the circuit protected is subject to surges. Another advantage of a second time delay tripping is that it gives the fault an opportunity to burn clear. The breaker trippings after the second trip are preferably relatively fast to take care of faults which are not self-clearing.

Accordingly, one object of this invention is to provide novel mechanism for controlling a reclosing circuit breaker.

Another object of this invention is to provide novel operating mechanism for a reclosing circuit breaker which is operative to lock the breaker contacts open in response to a predetermined number of successive reclosures thereof.

Another object of this invention is to provide in a circuit breaker of the type which is adapted to automatically open and close the circuit in a plurality of successive cycles of operation, novel means for providing an intermediate time delay opening of the breaker in any series of successive operations thereof.

Another object of this invention is to provide a novel arrangement of circuit breaker operating mechanism in a breaker of the type described.

Another object of this invention is to provide a novel compact arrangement of parts in a circuit breaker of the type described.

Another object of this invention is to provide a novel circuit breaker construction which is adapted to automatically open and close the circuit successively a predetermined number of times and then lock the breaker open in response to predetermined continuing electrical conditions of the circuit.

A further object of this invention is to provide in an automatic reclosing circuit breaker, novel means for maintaining the contacts thereof separated in response to a predetermined number of successive reclosures thereof, but which is ineffective to maintain said contacts separated in response to any number of non-successive reclosures, or any number of successive reclosures less than said predetermined number.

These and other objects of this invention will become more apparent upon consideration of a detailed description of a preferred embodiment thereof, when taken in connection with the attached drawings, in which Figure 1 is a substantially central, longitudinal sectional view of one form of a circuit interrupter embodying the features of this invention.

Figure 1:
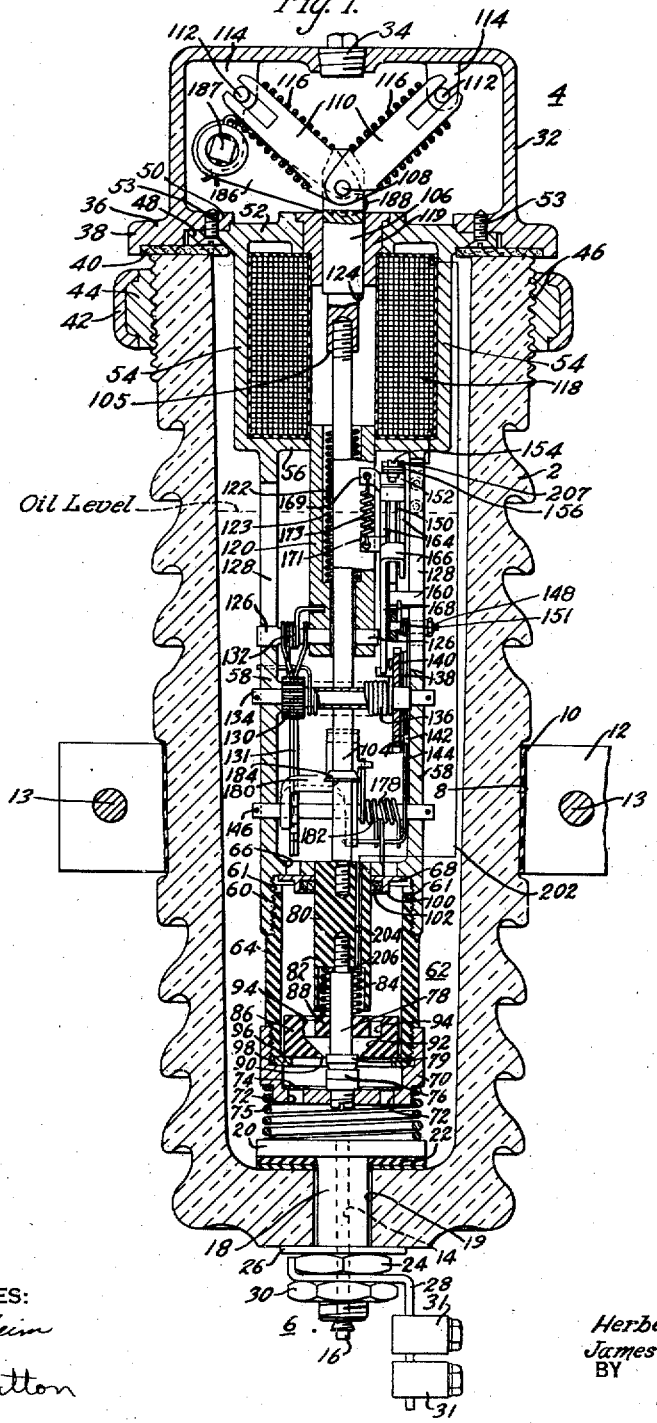

Referring to the drawings, the embodiment of the invention illustrated includes a circuit interrupter adapted to be contained in an insulating tubular casing 2, which may be of any desired insulating material, such as porcelain glass, or the like. The casing 2, as shown in Fig. 1, has a closed bottom end portion and an open top. The open top is provided with an upper terminal cover assembly 4, and the closed bottom of the casing is provided with a lower terminal assembly 6. An intermediate portion of the casing has a substantially cylindrical outer wall portion 8, upon which is mounted a cushioning sleeve 10 of rubber, fiber or the like, and on opposite sides of which may be clamped supporting bracket halves 12 (only one of which is shown) as by bolts 13. The supporting bracket portions 12 are adapted to be extended at one end thereof to support the interrupter in an operative position.

The lower terminal assembly 6 is mounted at the closed bottom portion of the insulating casing 2 by means of a conducting bolt 18, extending through an aperture 19 in the closed end of casing 2, and the bolt is provided with an enlarged disc-like head portion 20 positioned within the casing, with packing material 22 interposed between the head 20 and the adjacent inner surface of the closed end of insulating casing 2. The packing material 22 may be of any desired packing material, preferably one which is resistant to oil, such, for example, as cork, fiber or a synthetic rubber. Bolt 18 has a bore 14 therethrough, the outer end of which is closed by a threaded plug 16 for the purpose of draining casing 2 when desired. The bolt 18 is secured in position by a nut 24 drawn up on the bolt against a washer 26, positioned between the nut 24 and the outer wall at the closed end of casing 2. A terminal strap 28 having connector elements 31 thereon, may be also secured to the bolt 18 by means of a second nut 30, as shown.

The upper terminal assembly 4 is in the form of a cover for the open end of the casing and, as will be hereinafter more fully explained, also acts to secure the support for the interrupter and operating mechanism in operative relation at the open end of the casing.

Figure 3:
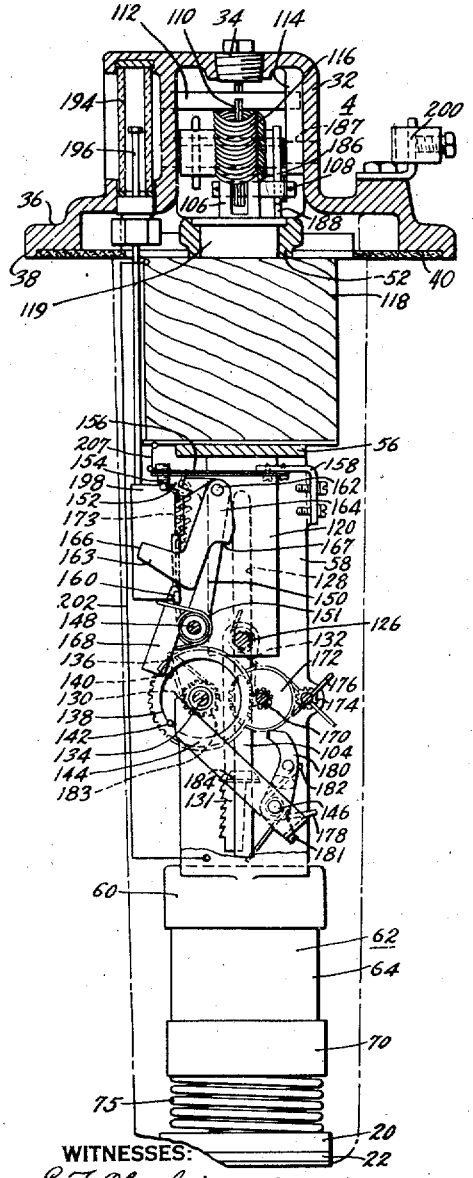
Fig. 3 is a side elevational view of the mechanism shown in Figs. 1 and 2, with a portion of the supporting frame removed.
Figure 4:
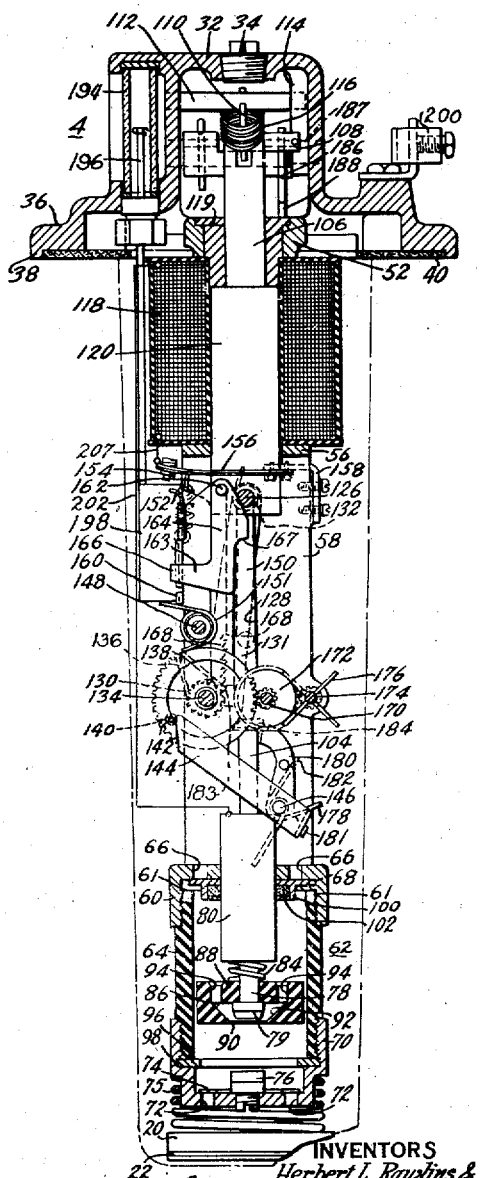
Fig. 4 is a view like Fig. 3 but illustrating the position of the parts with the breaker contacts locked open.

Referring to Figs. 3 and 4, it will be noted that the cover 32 is provided with a transversely extending hollow portion for the reception of certain parts of the circuit breaker operating mechanism, and the top wall of this hollow portion is provided with a threaded aperture for the reception of a screw threaded filler plug 34, so that the supply of arc extinguishing fluid within the casing 2 may be renewed when necessary. Cover 32 also includes a peripheral flange portion 36 adapted to seat on the upper end walls of casing 2, and this flange has at its outer edge a downwardly turned lip portion 38, to aid in properly positioning the cover on the open end of casing 2. Packing material 40 is interposed between the cover flange 36 and the open end of the casing, and this material is preferably similar to packing material 22 previously described. Cover 32 is secured to the casing 2 by means of a support 42, fixedly mounted on the outside of casing 2. Support 42 is in the form of an annulus which is substantially channel-shaped in cross section, with the channel facing the outer surface of casing 2. The annular support 42 is secured to casing 2 by cast metal or the like 44, which is poured in between the support 42 and the outer casing wall, so as to enter within the channel support 42 and between corrugations 46 provided on the outer surface of the casing to securely anchor the support 42 thereto. Cover 32 is preferably secured to support ring 42 by spaced bolts passing through integral outstanding ears (not shown) provided on the cover and supporting ring, respectively. The casing and its terminal assembly thus far described are substantially like that disclosed and claimed in the copending application of J. M. Wallace, Serial No. 345,051, filed July 12, 1940, and assigned to the same assignee as this invention.

As stated above, cover 32 is adapted to secure a support for the interrupter and its operating mechanism in operative relation at the open end of casing 2. This support for the interrupter and its operating mechanism (as shown) includes an upper substantially rectangular open frame portion having top and bottom walls 52 and 56, respectively, and side walls 54. Depending from the bottom wall 56 of the upper rectangular frame portion, are a pair of spaced, substantially parallely extending supporting plate members 58, for supporting the interrupting chamber 62 at the lower ends thereof. The upper rectangular supporting frame portion is provided adjacent the top wall 52 thereof, with oppositely positioned, outwardly extending supporting flanges 48, adapted to be positioned on top of the end wall of casing 2, and be secured in position by screws 53 engaging flanges 48 and an integral lip 50 formed on cover 32.

The interrupting chamber 62, includes a tubular insulating chamber portion 64 formed of any desired insulating material such, for example, as fiber or the like, which is adapted to have one end thereof threadedly engaged with a threaded socket 60 formed integral with the lower ends of supporting plates 58. The upper wall of socket 60 is provided with a plurality of spaced outlet passages 66, which are controlled by a disc-like valve member 68 mounted within insulating tube 64, and which operates to control the outlet passages 66 in a manner to be hereinafter described. Insulating tube 64 of the interrupter chamber is provided at the other end thereof with an end cap 70, threadedly engaged with the lower end of the insulating tube to close the same. The cap 70 is provided with passages 72 for the flow of fluid into arc chamber 62, and these passages are controlled by a check valve plate 74 adapted to be seated over inlet passages 72, within arc chamber 62. End cap 70 is also provided with a substantially centrally located threaded aperture for the reception of a threaded fixed contact 76.

A movable contact assembly is adapted to cooperate with fixed contact 76, and includes a relatively short contact rod 78 located within interrupting chamber 62, and having an enlarged contact portion 79 with a tapered outer end for engagement with fixed contact 76. Short contact rod 78 is adapted to have the upper end thereof, as viewed in the drawings, threaded into a bore provided centrally of an iusulating contact supporting rod 80, which is slidably mounted in a central aperture provided in socket 60. The lower end of insulating contact rod 80 is provided with a counter-bore 82 for receiving a coil compression spring 84, adapted to be seated at the other end thereof on a liquid director member 86. The liquid director 86 is substantially circular in form and includes a base portion 88 having a substantially central aperture for slidably mounting the director on short contact rod 78, for movement between enlarged portion 79 of the contact rod and the lower end of insulating contact rod 80. Coil spring 84 normally biases the liquid director 86 towards the enlarged end 79 of short contact rod 78. However, in the closed position of the contacts, as shown, for example, in Fig. 1, spring 84 will be compressed, so that the liquid director will be located adjacent to the lower end of insulating contact rod 80. The liquid director 86 is provided with passages therethrough for directing the liquid into the path of an arc drawn when the contacts separate, and these include an outlet 90 located adjacent the enlarged contact portion 79, and this opens into a divergent passage 92 in the director, which in turn communicates with a plurality of spaced inlet passages 94, into which liquid contained in the interrupter chamber 62 is adapted to flow when the liquid director is moved upwardly. In the closed position of the contacts, liquid director 86 is adapted to rest on a stop ring 96 secured between a shoulder 98 on end cap 70, and the lower end of insulating tube 64. Valve plate 68 at the upper end of interrupting chamber 62 is provided with an integral angular flange 100 adapted to form a substantially annular groove about the outer surface of insulating contact rod 80, for the reception of packing material 102 to frictionally associate valve plate 68 with insulating contact rod 80.

With the exception of contact supporting rod 80 being of insulating material, the interrupter structure described above is substantially the same as that described in the copending application of J. M. Wallace, Serial No. 374,684, filed January 16, 1941, and assigned to the same assignee as this application, now matured as Patent No. 2,352,048, issued June 20, 1944. Consequently, for a fuller understanding of the structure and operation of the interrupter, reference is hereby made to the above-mentioned copending application. Briefly, the operation of the interrupter 62 is as follows. When contact supporting rod 80 is moved upwardly carrying with it contact rod 78 and contact portion 79, the liquid director 86 is held in engagement with stop ring 96, until the base 88 thereof is engaged by the enlarged contact portion 79, by the biasing action exerted by coil spring 84. However, as soon as the contacts separate an arc will be drawn therebetween causing vaporization of the arc extinguishing fluid which will build up pressure within the interrupting chamber 62. This pressure forces check valve plate 74 to seat on and close off inlet passages 72, and upward movement of contact rod 80 carries valve plate 68 into a closed position with respect to outlet passages 66, to thereby effectively seal the interrupting chamber 62 during the circuit interrupting operation. As soon as the enlarged contact portion 79 on contact support 78 engages wall 88 of the liquid director, the director is moved upwardly along with the contact, and liquid will flow through inlet passages 94 and be directed through outlet passage 90 which will now be positioned as shown in Fig. 4 of the drawings, to direct liquid through the arc path. This lost motion between the contact and liquid director, when the circuit in interrupted, permits easy initial opening movement of the contacts and allows sufficient pressure to build up within the interrupter chamber 62 to close the valve 74, and permits the arc to reach an optimum length before subjecting the same to currents of arc extinguishing liquid. It will be noted that the pressure built up within the interrupter chamber will also act on the relatively large contact supporting rod 80 to assist in moving contact 78 away from fixed contact 76, inasmuch as the supporting rod 80 fits in a piston-like manner in socket 60.

After the circuit is interrupted, the contacts may be reclosed and it will be apparent that as soon as contact supporting rod 80 moves downwardly, it will carry valve plate 68 with it into engagement with the upper edge of insulating tube 64, which is notched as at 61, to permit free outlet of used fluid and any gases which may have been produced by the interrupting operation. At the same time, the head of liquid in insulating casing 2 will cause check valve plate 74 to raise and allow fresh fluid to enter inlet passages 72 to replace the used liquid.

Contact supporting rod 80 is adapted to be actuated by an elongated actuating rod 104 threadedly engaged in a bore in the upper end of rod 80, and having the opposite end secured in a threaded socket in the lower end of a connecting rod 106. The connecting rod 106 has an enlarged portion forming a shoulder 124, and the enlarged portion is adapted to be slidably mounted in a closure plug 119 secured in upper wall 52 of the supporting frame. The upper end of connecting rod 106 is bifurcated for receiving the ends of a pair of toggle links 110 pivotally secured to connecting rod 106 as by a pivot pin 108. The toggle levers 110 are adapted to diverge and have their opposite ends slotted to receive fixed guide pins 112, respectively, mounted on integral supporting lug portions 114 formed on cover 32. A coiled compression spring 116 is adapted to be coiled about each toggle lever 110 to react between the supporting pins 112 and a shoulder formed on each toggle lever 110 to normally bias actuating rod 104 in a direction to force contact portion 79 into engagement with fixed contact 76.

In order to separate the contacts, a solenoid coil 118 is adapted to be mounted in the rectangular portion of the supporting frame, and the coil is provided with a core 120 adapted to be drawn up into a center bore in the coil. The solenoid core 120 is movably mounted on connecting rod 104, and is provided with a counterbore portion 122 for receiving therein a coil spring 123. Preferably, the core plug 119 at the upper end of solenoid coil 118 is, like movable core 120, and sides 54 of the supporting frame, of a magnetic material, so as to form a closed magnetic path when plug 119 is engaged by movable core 120.

The solenoid coil 118 is adapted to be connected in series in the circuit through the interrupter, as will be hereinafter described, and upon the occurrence of overload conditions in the circuit, the solenoid coil will attract movable core 120, and move the same upwardly without moving rod 104 or contact 79, until coil spring 123 engages the lower end 105 of connecting rod 106. From this point on, further movement upwardly of movable core 120 will cause compression of spring 123, until the upper end of the core engages shoulder 124 on connecting rod 106 to deliver an impact on connecting rod 104, to separate contact portions 79 and 76, notwithstanding any possible welding of the contacts together. This will cause contact 79 to move upwardly and it is carried for the completion of its stroke after solenoid core 120 engages plug core 119, by the force stored in coil spring 123. Coil spring 123 is preferably of such strength as to overcome the force exerted by toggle springs 116 after a predetermined strain thereof. Moreover, it may be noted that the force exerted by toggle springs 116 in a direction to cause engagement of contact portion 79 with fixed contact 76, will decrease as the contact 79 moves upwardly, because of the toggle effect of levers 110. Moreover, the opening movement of the contacts is further aided by the pressure which may be developed by the arc formed when the contacts separate, acting to move contact rod 79 upwardly, as described above.

Movable solenoid core 120 is provided adjacent the lower end thereof with oppositely projecting pins 126 having enlarged outer ends for reception in guide slots 128, formed in supporting plates 58, to prevent rotation thereof about a longitudinal axis. A rack 131 is adapted to be pivotally mounted on one of the pins 126 for engagement, in one position of solenoid core 120, with a pinion 130 mounted on a shaft 134 extending between, and rotatably mounted in the spaced frame members 58. A spring 132 is adapted to be coiled about guide pin 126, with one end thereof engaging movable core 120, and the other end thereof engageable with rack 131, to normally urge the rack into engagement with pinion 130. It will be noted that the teeth on rack 131 are inclined downwardly so that in the upward motion of the rack with movable core 120, the teeth of the rack will slide freely over the teeth of pinion 130; but on downward motion of the rack the teeth will engage pinion 130 to rotate the same in a clockwise direction as viewed in Figs. 3 and 4. A relatively large gear 138 is also fixed to shaft 134, and this shaft, together with pinion 130 and gear 138, are biased in a counterclockwise direction by a spring 136 coiled about shaft 134, and having one end thereof engageable with the supporting frame, and the other end thereof engaging a pin 140 on gear 138. The pin 140 projecting from one side of gear 138 is adapted to control a trip controlling member in a manner to be hereinafter further specified.

A short stop lug 142 projects from the opposite side of gear 138 and is normally adapted to engage a lever 144 pivotally mounted on the supporting frame, as by the pivot pin 146, and engageable at the outer end thereof with shaft 134, so that, as viewed in Figs. 3 and 4, the stop pin 142, by its engagement with lever 144, limits movement of gear 138 in a counterclockwise direction under the influence of spring 136. A control lever 150 is preferably pivotally mounted as at 148, on one supporting plate 58, and is provided at one corner of the free end thereof with a curved catch 152, insulatingly secured to control lever 150 in any desired manner, and adapted to be engaged by an adjustable stop lug 154 mounted in the free end of a bimetal element 156. Bimetal element 156 is supported from the frame 58 by an angular bracket 158 and is of conventional construction, that is, it includes a pair of laminations of materials having different coefficients of expansion intimately secured together, with the material having the larger coefficient of expansion comprising the lower lamination, so that upon being heated, the bimetal will deflect upwardly as viewed in the drawings.

It can be seen, therefore, that the bimetal lug 154, normally, as shown in Fig. 3, prevents counterclockwise rotation of control lever 150. Clockwise rotation of control lever 150 about its pivot 148, is limited by a laterally projecting stop lug 160 integral with the lever, and engageable with an edge of the adjacent supporting plate 58. At the other corner of the free end of control lever 150, there is pivotally mounted as at 162, a contact stop lever 164. This lever, at its upper portion, comprises a pair of legs pivoted on pivot pin 162, at opposite sides of control lever 150, and having laterally extending integral portions 163 connected at their outer ends by an integral stop portion 166, which is engageable with control lever 150 in the position of contact stop lever 164 shown in Fig. 4 of the drawings, to limit relative counterclockwise rotation thereof. One leg of contact stop lever 164, and control lever 150 are provided with lateral extensions 169 and 171, respectively, which are apertured so that the ends of a coiled tension spring 173 may be hooked into these extensions to bias contact stop lever 164, relative to control lever 150, in a counterclockwise direction about pivot point 162. One of the legs of contact stop lever 164 is extended, as shown at 168, so as to be engageable by control pin 140 on gear 138, to normally maintain the contact stop lever in the position shown in Fig. 3 of the drawings, so that the stop portion 167 of the lever is maintained out of the path of movement of pin 126 on solenoid core 120. Gear 138 is adapted to drive a time delay means, comprising pinion 170 with which gear 138 meshes, gear 172 fixed for rotation with pinion 170, and pinion 174 adapted to mesh with gear 172 for driving a paddle wheel 176, positioned below the level of the arc extinguishing liquid within casing 2.

In the operation of the mechanism thus far described, it can be seen that when the contacts are opened by sufficient energization of solenoid coil 118 to draw movable core 120 upwardly into the coil, that even prior to movement of contact 79 by the solenoid, rack 131 will engage pinion 130, irrespective of the amount of travel of the contact necessary to interrupt the circuit. After interruption occurs, contact 79 is moved into engagement with fixed contact 76 by toggle springs 116. This circuit closing operation will always cause rack 131 to rotate the time delay mechanism a predetermined amount, inasmuch as rack 131 is secured to solenoid core 120 and, therefore, its movement is independent of the amount of separating movement of the contact rod 104 as pointed out above. As the contacts are reclosed following an initial circuit interrupting operation, it will be observed that rack 131 will rotate gear 138 in a clockwise direction as viewed in Figs. 3 and 4 against the bias of spring 136, and this rotation will remove control pin 140 from contact stop lever 164 to permit this lever to be moved by spring 173 in a counterclockwise direction about pivot 162, to a position limited by connecting stop portion 166 and wherein the hook portion 167 of the lever is positioned at a point to intercept pin 126 on solenoid core 120, in the event a closely succeeding interrupting operation occurs. In the event the overload on the circuit has disappeared when the contacts are reclosed, gear 138 will be rotated in a counterclockwise direction by spring 136 slowly, since spring 136 must operate the time delay gearing and paddle wheel 176, until eventually control pin 140 re-engages portion 168 of contact stop lever 164 and moves it back to the position shown in Fig. 3 of the drawings. In this position, it is obvious that in the event an overload again occurs in the circuit, the contacts will be quickly separated by solenoid 118.

In the event, however, that upon reclosure after the first interrupting operation of the circuit breaker, the overload still exists on the circuit, solenoid coil 118 will immediately again lift movable core 120 upwardly, but its movement in this direction is now limited by hook portion 167 of contact stop lever 164, so that its movement will be halted before it is operative to raise contact 79. However, bimetal 156 is connected in series with solenoid coil 118 in the circuit through the interrupter, as will be hereinafter pointed out, and after a predetermined period of time the bimetal becomes heated by the overload current, and deflects to the position shown in Fig. 4, thus releasing catch 152 on control lever 150, so that this lever and stop lever 164 are now free to rotate as a unit about pivot 148 of lever 150, under the biasing force exerted by the solenoid pull through pin 126 on hook portion 167, which pull is exerted along a line offset with respect to pivot 148. This will free the pin 126 and permit the contacts to be opened in the manner previously described. After the circuit is interrupted the contacts will be reclosed by toggle springs 116, with the reclosure again being delayed by operation of the time delay mechanism by rack 131. If the fault has been cleared after the second reclosure, bimetal 156 will gradually assume its normal position shown in Fig. 3 to engage catch 152 on trip control lever 150, and gear 138 will be eventually rotated to the position where control pin 140 removes stop portion 167 of lever 164 from the path of movement of solenoid pin 126, and stop pin 142 engages lever 144. It should be noted that control lever 150 is normally biased to the position shown in Figs. 3 and 4 of the drawings, that is, where stop lug 160 thereof engages the edge of adjacent support plate 58, by a spring 151 coiled about pivot 148 and engaging stop lug 160, and adjacent supporting plate 58.

If the fault has not been cleared by the time the second reclosure is made, the breaker contacts are again quickly separated by solenoid coil 118, and this time there is no time lag before the contacts separate because the bimetal has not had time to cool down, and consequently will remain in the position shown in Fig. 4 of the drawings; and, therefore, levers 164 and 150 may be rotated about pivot 148 by core pin 126 on the upward stroke of the solenoid core.

It can be seen from the foregoing that upon the occurrence of a continuing fault in the circuit, the breaker contacts will be opened a plurality of times, with the first interrupting operation occurring substantially instantaneously in response to the occurrence of the fault, and the second closely succeeding interrupting operation will be delayed a predetermined time depending upon the time necessary to heat bimetal 156. Thereafter, any subsequent interruption will be relatively faster because the time delay means 156 being in a deflected position, will be inoperative to delay any such closely succeeding tripping operation. However, in the event that the fault clears after any reclosure of the breaker contacts, the mechanism will reset so that whenever a continuing fault occurs at a later time, the same sequence of circuit interrupting operations will occur, that is, a first quick opening of the contacts, a second time delay opening, and a quick opening thereafter. In connection with the intermediate time delay opening operation of the breaker contacts, it should be noted that the lost motion connection of the solenoid core with the movable contact, is utilized to prevent separation of the contacts for a time predetermined by bimetal 156. The above described arrangement of successive circuit interrupting operations has the advantage that better coordination with fuses can be obtained when the circuit being protected is subject to surges.

Means are provided in association with the mechanism described above for locking the breaker contacts in open circuit position, in response to a predetermined number of closely successive interrupting operations. The lever 144 previously referred to, is adapted to control this lockout means, and it will be noted that this lever is normally biased into engagement with shaft 134, by a spring 178 coiled about pivot 146, and engageable with a lateral extension of the lever and with socket portion 60 of the interrupting chamber. Also pivotally mounted on the lever pivot 146, is a lockout lever 180, which is biased with respect to lever 144, for movement in a counterclockwise direction, by spring 182 also coiled about pivot 146, and having opposite ends thereof engaging lever 144 and lockout lever 180. A lug 181 on lockout lever 180 is engageable with a lateral extension of lever 144 to limit movement of lockout lever 180 relative to lever 144 under the influence of its spring 182.

As previously described, each time the interrupter contacts are closed, rack 131 is operative to rotate pinion 130 and, therefore, gear 138 in a clockwise direction as viewed in Figs. 3 and 4 of the drawings, and after the contacts are reclosed, the gear 138 is then slowly moved back to its normal position shown in Fig. 3. However, in the event of the occurrence of a continuing fault on the circuit, before gear 138 is restored to its original position following a reclosure of the breaker contacts, these contacts are again reopened and gear 138 upon a second reclosure of the contacts is further advanced a predetermined distance in a counterclockwise direction by rack 131, to bring stop lug 142 into engagement with the upper edge of lever 144 to move lockout lever 180 into engagement with rod 104 just prior to engagement of the contacts. Now if the fault still remains, the contacts are instantaneously reopened before gear 138 can be moved any substantial distance from its thus advanced position in a counterclockwise direction, at this time shoulder 184 on rod 104 cams lockout lever 180 outwardly in its upward movement so that when a third reclosure is attempted by toggle springs 116, the integral shoulder 184 on rod 104 will engage the lockout lever 180 and prevent reclosure of the circuit breaker contacts. It will be noted that pinion 130 is provided with a solid tooth portion 183 which, when rack 131 attempts to reclose the contacts a third successive time, will be moved to engage the cam rack 131 out of engagement with pinion 130, and thereby permit the rack and solenoid core 120 to drop down under the influence of gravity and spring 123 to the position shown in Figs. 1 and 3. This will obviously permit spring 136 to reset gear 138 into engagement with the inclined end of lever 144. However lockout lever 180 is maintained in the position shown in Fig. 4 to lock the contacts open by reason of its frictional engagement with shoulder 184.

To reset the breaker, that is, to place it in service again following an automatic lockout operation, it is necessary to raise the moving contact in order to release lockout lever 180 and permit spring 178 to move the lever away from rod 104 and thus release the movable contact and permit the same to be reclosed by toggle springs 116.

The movable contact may be manually lifted by means of a lever 186 secured to a shaft 187 extending transversely across the hollow portion of cover 32, with one end thereof extended outside of the hollow portion of the cover to have secured thereto an operating crank 190. The crank 190 has an enlarged aperture 192 at the outer end thereof, for the reception of a hook stick operating member or the like. It will be noted that operating crank lever 186 is provided with a curved inner end 188, positioned at one side of toggle levers 110 and beneath toggle pivot pin 108, so that although rod 104 and movable contact 79 may be raised by lever 186 manually, contact 79 cannot be moved into engagement with the fixed contact 76 by this lever, and consequently it is obvious that the breaker contacts are trip free of manually operable lever 190 inasmuch as they may be automatically opened by the current responsive tripping means, independent of operation of the manual control lever 190.

Figure 2:
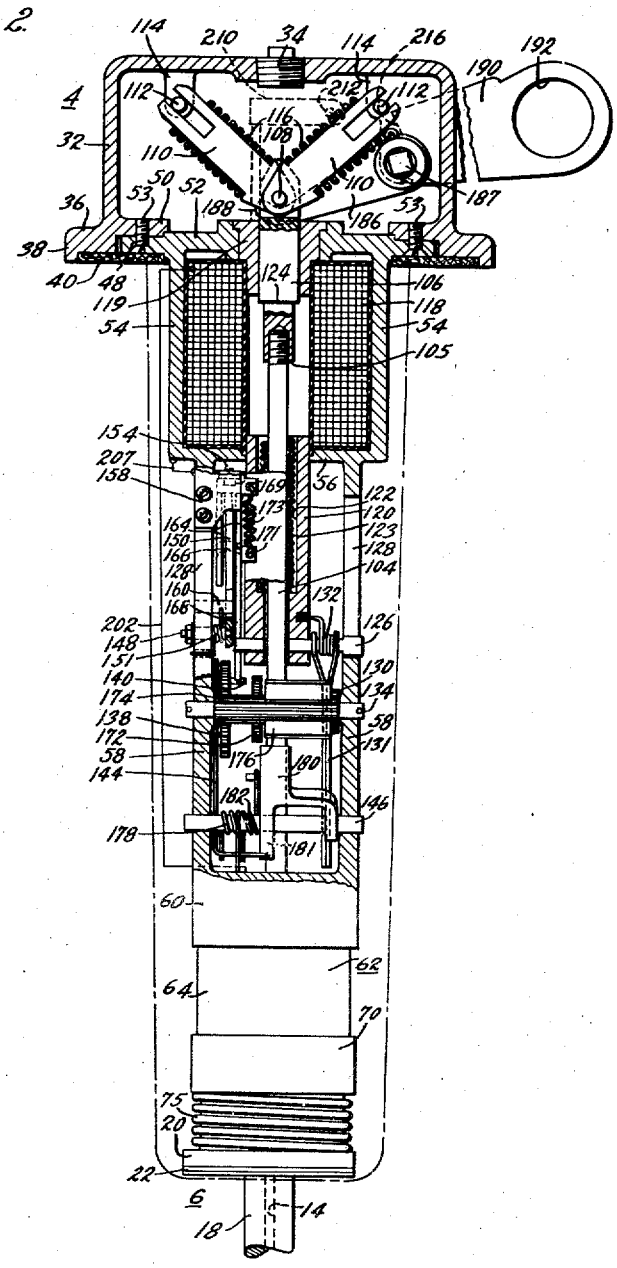
Fig. 2 is a view similar to Fig. 1, but taken from the opposite side thereof and showing certain of the parts in elevation and with the outer casing removed.

As in copending application of H. L. Rawlins and J. M. Wallace, Serial 346,300, filed July 19, 1940, Patent No. 2,318,421, issued May 4, 1943, and assigned to the same assignee of this invention, the cover 32 may be provided with a manually operable locking means for maintaining the breaker contacts in an open circuit position when desired, as by a locking lever 210 pivotally mounted on the outside of the cover as at 212 and normally resting on a supporting rib 214. Operating crank 190 is provided with an integral stop shoulder 216 positioned so as to be engageable with locking lever 210 when the latter is manually rotated clockwise as viewed in Fig. 2, when the operating crank is in its lower position corresponding to the open circuit position of the contacts. The cover may also be provided with a sight glass 194 as in the aforesaid copending application for observation of a rod 196 mounted on a float 198, to render the level of arc extinguishing fluid readily visible from the exterior of the interrupter. Likewise, the cover may embody a terminal 200 for connection of a circuit conductor thereto.

The electrical circuit through the breaker may be traced from the lower terminal 31, conducting strip 28 to bolt 18, its enlarged head 20, through coiled compression spring 75 engageable between the enlarged head 20 of bolt 18 and end cap 70 of interrupter chamber 62, through fixed contact 76 and contact rod 78. The insulating contact rod support 80 is provided with an off center bore 204 for receiving a flexible conductor 202, which is connected to contact rod 79 as at 206, and this flexible conductor is directed upwardly to be connected to one end of solenoid coil 118. The other end of solenoid coil 118 is connected by a flexible conductor 207, to the free end of bimetal 156, and since the bimetal is supported on frame supporting plate 58, the circuit proceeds from the bimetal through the frame to cap 32 and terminal 200. It can be seen, as previously referred to, that the coil 118 and bimetal 156 are thereby arranged in series circuit relation so as to be effective to interrupt the circuit in the manner described above.

From the foregoing, it can be seen that the circuit breaker constituting this invention is capable of giving a relatively quick or an instantaneous opening when an overload first occurs on the circuit, and in the event the overload continues after automatic reclosure of the breaker contacts, a second time lag opening will occur, and thereafter in the event the fault continues the subsequent opening will be a quick or instantaneous one, and thereafter the breaker contacts will be locked in an open circuit position. It will also be noted that the time delay means operative to delay a reclosure of the breaker contacts is dependent upon the viscosity of the arc extinguishing fluid, so that the time delay in reclosing the breaker contacts will correspond to the time necessary for flushing the interrupting chamber so as to always insure a good flushing action and replacement of used arc extinguishing liquid in the interrupting chamber 62, with fresh liquid. Another important feature is that this time delay in reclosure of the breaker contacts will be a constant value for any given viscosity of arc extinguishing fluid, due to the fact that the time delay is controlled by movement of the solenoid core, rather than by movement of the contacts, and because of the lost motion between the core and movable contact, the movement of the core will always be sufficient to engage rack 131 with the time delay reclosing means on each interrupting operation of the breaker. Also novel means have been disclosed for locking the breaker contacts in an open circuit position in response to a predetermined number of closely successive interrupting operations, but which will be inoperative to lock the breaker contacts open irrespective of the number of non-successive interrupting operations of the breaker.

Certain of the features of this invention not specifically claimed herein are disclosed and claimed in our copending application Serial No. 564,442, filed November 21, 1944, and comprising a division of this application which is assigned to the same assignee of this invention.

Having described a preferred embodiment of the invention in accordance with the patent statutes, it is desired that the invention be not limited to this particular embodiment inasmuch as it will be obvious particularly to persons skilled in the art that many modifications may be made in this particular structure and still remain within the scope of this invention. Accordingly, it is desired that the invention be interpreted as broadly as possible and that it be limited only by what is expressly set forth in the following claims and by the prior art.

We claim as our invention:

1. In circuit interrupting means, separable contacts, a single means responsive to a predetermined circuit condition controlling separation of said contacts comprising a relatively quick acting control device, means for automatically closing said contacts following a circuit interrupting operation, blocking means automatically effective in response to a circuit interrupting operation for preventing operation of said control device to separate said contacts, and time delay means operative to render said blocking means ineffective to permit said control device to separate said contacts only a predetermined time after a first circuit interrupting operation, whereby upon the occurrence of said predetermined condition said control device will cause a quick separation of said contacts and thereafter said contacts will automatically reclose, and if said predetermined condition still exists said contacts will be separated a second time by said control device only a predetermined time after the first circuit interrupting operation.

2. In circuit interrupting means, separable contacts, means controlling separation of said contacts including relatively quick acting means for separating said contacts in response to predetermined conditions, means for automatically reclosing said contacts in response to a circuit interrupting operation, and time delay means automatically engageable with said quick acting means in response to a circuit interrupting operation for delaying a closely succeeding circuit interrupting operation by said quick acting means for a predetermined time after reclosure of said contacts in the event said predetermined conditions continue.

3. In circuit interrupting means, separable contacts, means controlling separation of said contacts including means for relatively quickly separating said contacts in response to predetermined circuit conditions, means responsive to a first circuit interrupting operation for preventing separation of said contacts by said contact controlling means, time delay means also responsive to said predetermined circuit conditions for rendering said last mentioned means ineffective a predetermined time after a first circuit interrupting operation in the event said predetermined conditions remain on the circuit.

4. In a circuit interrupter, separable contact means, electromagnetic means for separating said contacts, means for automatically reclosing said contacts in response to a circuit interrupting operation, means having a part biased to move in response to a predetermined circuit interrupting operation to one position for preventing a closely succeeding separation of said contacts under the influence of said electromagnetic means, and timing means responsive to operation of said contacts for moving said part away from said one position a predetermined time after reclosure of said contacts in the event said electromagnetic means is not energized sufficiently to attempt another circuit opening operation.

5. In a circuit interrupter, separable contacts, relatively quick acting means for separating said contacts in response to a predetermined circuit condition, means for automatically closing said contacts in response to a circuit interrupting operation, movable stop means adapted to move in response to operation of said contact closing means to a position to prevent operation of said quick acting means to open said contacts, and time delay means for maintaining said stop means in said position a predetermined time interval.

6. In a circuit interrupter, separable contacts, relatively quick acting means for separating said contacts in response to a predetermined circuit condition, means for automatically closing said contacts in response to a circuit interrupting operation, movable stop means adapted to move in response to operation of said contact closing means to a position to prevent operation of said quick acting means to open said contacts, and time delay means responsive to a condition of said circuit for maintaining said stop means in said position a predetermined time interval.

7. In a circuit interrupter, separable contacts, means for separating said contacts in response to a predetermined circuit condition, means for automatically closing said contacts in response to a circuit interrupting operation, means for delaying closing movement of said contacts including an actuating member adapted to be advanced a predetermined amount by each operation of said reclosing means, movable stop means movable in response to advancement of said member to one position for preventing operation of said contact separating means to open said contacts, means for slowly returning said member to its original position to restore said stop means to its original position a predetermined time after advancement of said member, and time delay means responsive to a condition of said circuit also effective to restore said stop means to its original position.

8. In a circuit interrupter, separable contacts, means for separating said contacts in response to a predetermined circuit condition, means for automatically closing said contacts in response to a circuit interrupting operation, means for delaying closing movement of said contacts including an actuating member adapted to be advanced a predetermined amount by each operation of said reclosing means, means for releasably holding said contacts separated, said last mentioned means adapted to be actuated by said actuating member after it has been advanced a predetermined amount, movable stop means movable in response to advancement of said member for preventing operation of said contact separating means to open said contacts, means for slowly returning said member to its original position to restore said stop means to its original position a predetermined time after advancement of said member, and time delay means responsive to a condition of said circuit also effective to restore said stop to its original position.

9. In circuit interrupting means, separable contacts, means controlling separation of said contacts including means for relatively quickly separating said contacts in response to predetermined circuit conditions, means responsive to a first circuit interrupting operation for preventing separation of said contacts by said contact controlling means, time delay means also responsive to said predetermined circuit conditions for rendering said last mentioned means ineffective a predetermined time after a first circuit interrupting operation in the event said predetermined conditions remain on the circuit, and means resetting said contact separation preventing means in the event said predetermined conditions are removed from the circuit.

10. In a circuit interrupter, separable contacts, means for separating said contacts in response to a predetermined circuit condition, means for automatically closing said contacts in response to a circuit interrupting operation, means for delaying closing movement of said contacts including an actuating member adapted to be advanced a predetermined amount by each operation of said reclosing means, means responsive to predetermined advancement of said actuating member for preventing reclosure of said contacts, movable stop means movable in response to advancement of said member for preventing operation of said contact separating means to open said contacts, and means for slowly returning said member to its original position to restore said stop means to its original position a predetermined time after advancement of said member.

11. In a circuit interrupter, separable contacts, means for separating said contacts in response to a predetermined circuit condition, means for automatically closing said contacts in response to a circuit interrupting operation, means for delaying closing movement of said contacts including an actuating member adapted to be advanced a predetermined amount by each operation of said reclosing means, a stop member pivotally mounted on a movable support and biased for movement relative to said support to an active position but normally held in an inactive position by said actuating member, a part movable with said contact separating means engageable with said stop member in its active position in a manner to bias said support for movement upon an attempt by said contact separating means to separate said contacts, and time delay means responsive to said predetermined circuit condition for permitting movement of said support and allowing separation of said contacts.

12. In circuit interrupting means, separable contacts, a single means responsive to a predetermined circuit condition controlling separation of said contacts comprising a relatively quick acting control device, means for automatically closing said contacts following a circuit interrupting operation, blocking means automatically effective in response to a circuit interrupting operation for preventing operation of said control device to separate said contacts, time delay means operative to render said blocking means ineffective to permit said control device to separate said contacts only a predetermined time after a first circuit interrupting operation, whereby upon the occurrence of said predetermined condition said control device will cause a quick separation of said contacts and thereafter said contacts will automatically reclose, and if said predetermined condition still exists said contacts will be separated a second time by said control device only a predetermined time after the first circuit interrupting operation, said closing means effecting a second reclosure of said contacts after the second separation, and said time delay means effective to maintain said blocking means ineffective at least a predetermined time after said second reclosure, whereby if said predetermined condition still exists the third successive separation of said contacts will be effected quickly like the first separation.

13. In circuit interrupting means, separable contacts, a single means responsive to a predetermined circuit condition controlling separation of said contacts comprising a relatively quick acting control device, means for automatically closing said contacts following a circuit interrupting operation, blocking means automatically effective in response to a circuit interrupting operation for preventing operation of said control device to separate said contacts, time delay means operative to render said blocking means ineffective to permit said control device to separate said contacts only a predetermined time after a first circuit interrupting operation, whereby upon the occurrence of said predetermined condition said control device will cause a quick separation of said contacts and thereafter said contacts will automatically reclose, and if said predetermined condition still exists said contacts will be separated a second time by said control device only a predetermined time after the first circuit interrupting operation, said closing means effecting a second reclosure of said contacts after the second separation, said time delay means effective to maintain said blocking means ineffective at least a predetermined time after said second reclosure, whereby if said predetermined condition still exists the third successive separation of said contacts will be effected quickly like the first separation, and means responsive to said third separation of said contacts to prevent reclosure thereof.

14. In circuit interrupting means, separable contacts, means controlling separation of said contacts including relatively quick acting means for separating said contacts in response to predetermined conditions, means for automatically reclosing said contacts in response to a circuit interrupting operation, time delay means automatically engageable with said quick acting means in response to a circuit interrupting operation for delaying a closely succeeding circuit interrupting operation by said quick acting means for a predetermined time after reclosure of said contacts in the event said predetermined conditions continue, and a second time delay means responsive to a first circuit interrupting operation to cause disengagement of said first time delay means and quick acting means a predetermined longer time thereafter so that if said predetermined conditions are not present upon reclosure of said contacts, said contacts will be quickly separated if said conditions appear at a later time.

15. In circuit interrupting means, separable contacts, means controlling separation of said contacts including means for relatively quickly separating said contacts in response to predetermined circuit conditions, means responsive to a circuit interrupting operation to automatically reclose said contacts, means responsive to a first circuit interrupting operation for preventing separation of said contacts by said contact controlling means, time delay means also responsive to said predetermined circuit conditions for rendering said last-mentioned means ineffective a predetermined time after reclosure of said contacts in the event said predetermined conditions remain on the circuit.

16. In a circuit interrupter, separable contact means, electromagnetic means for separating said contacts, means for automatically reclosing said contacts in response to a circuit interrupting operation, means biased to move in response to a predetermined circuit interrupting operation to a position where it mechanically blocks a succeeding circuit interrupting operation of said electromagnetic means, and time delay means responsive to operation of said contacts for moving said blocking means to a non-blocking position a predetermined time after a first reclosure of said contacts in the event said electromagnetic means is not energized sufficiently to attempt another circuit opening operation.

17. In a circuit interrupter, separable contact means, electromagnetic means for separating said contacts, means for automatically reclosing said contacts in response to a circuit interrupting operation, time delay means automatically mechanically engageable with said contact separating means to delay an attempted closely successive circuit interrupting operation for a predetermined time following a first reclosure of said contacts, and timing means responsive to reclosure of said contacts for disengaging said time delay means after said predetermined time has expired to permit said electromagnetic means to quickly separate said contacts at a later time.

18. In circuit interrupting means, separable contacts, means controlling separation of said contacts including relatively quick acting means for separating said contacts in response to predetermined conditions, means for automatically reclosing said contacts in response to a circuit interrupting operation, time delay means automatically engageable with said quick acting means in response to a circuit interrupting operation for delaying a closely succeeding circuit interrupting operation by said quick acting means for a predetermined time after reclosure of said contacts in the event said predetermined conditions continue, second time delay means for delaying closure of said contacts and adapted to be advanced of a predetermined amount by closing movement of said contacts, said second time delay means normally maintaining said first time delay means disengaged from said quick acting means but permitting said engagement when advanced.

19. In circuit interrupting means, separable contacts, means controlling separation of said contacts including relatively quick acting means for separating said contacts in response to predetermined conditions, means for automatically reclosing said contacts in response to a circuit interrupting operation, time delay means automatically engageable with said quick acting means in response to a circuit interrupting operation for delaying a closely succeeding circuit interrupting operation by said quick acting means for a predetermined time after reclosure of said contacts in the event said predetermined conditions continue, second time delay means for delaying closure of said contacts and adapted to be advanced a predetermined amount by closing movement of said contacts, said second time delay means normally maintaining said first time delay means disengaged from said quick acting means but permitting said engagement when advanced, and means biasing said second time delay means to reset the same a predetermined time after an advancement thereof.

20. In circuit interrupting means, separable contacts, means controlling separation of said contacts including relatively quick acting means for separating said contacts in response to predetermined conditions, means for automatically reclosing said contacts in response to a circuit interrupting operation, time delay means automatically engageable with said quick acting means in response to a circuit interrupting operation for delaying a closely succeeding circuit interrupting operation by said quick acting means for a predetermined time after reclosure of said contacts in the event said predetermined conditions continue, second time delay means for delaying closure of said contacts and adapted to be advanced a predetermined amount by closing movement of said contacts, said second time delay means normally maintaining said first time delay means disengaged from said quick acting means but permitting said engagement when advanced, means biasing said second time delay means to reset the same a predetermined time after an advancement thereof, and normally inactive means for maintaining said contacts separated having a part positioned to be engaged by a part advanced by advancement of said second time delay means to render said normally inactive means active to maintain said contacts separated in response to a predetermined number of successive circuit interrupting operations.

21. In circuit interrupting means, separable contacts, means controlling separation of said contacts including relatively quick acting means for separating said contacts in response to predetermined conditions, means for automatically reclosing said contacts in response to a circuit interrupting operation, time delay means automatically engageable with said quick acting means in response to a circuit interrupting operation for delaying a closely succeeding circuit interrupting operation by said quick acting means for a predetermined time after reclosure of said contacts in the event said predetermined conditions continue, second time delay means adapted to be advanced a predetermined amount by closing movement of said contacts, said second time delay means normally maintaining said first time delay means disengaged from said quick acting means but permitting said engagement when advanced.

22. In circuit interrupting means, separable contacts, means controlling separation of said contacts including relatively quick acting means for separating said contacts in response to predetermined conditions, means for automatically reclosing said contacts in response to a circuit interrupting operation, time delay means automatically engageable with said quick acting means in response to a circuit interrupting operation for delaying a closely succeeding circuit interrupting operation by said quick acting means for a predetermined time after reclosure of said contacts in the event said predetermined conditions continue, second time delay means adapted to be advanced a predetermined amount by closing movement of said contacts, said second time delay means normally maintaining said first time delay means disengaged from said quick acting means but permitting said engagement when advanced, and means biasing said second time delay means to reset the same a predetermined time after an advancement thereof.

23. In circuit interrupting means, separable contacts, means controlling separation of said contacts including relatively quick acting means for separating said contacts in response to predetermined conditions, means for automatically reclosing said contacts in response to a circuit interrupting operation, time delay means automatically engageable with said quick acting means in response to a circuit interrupting operation for delaying a closely succeeding circuit interrupting operation by said quick acting means for a predetermined time after reclosure of said contacts in the event said predetermined conditions continue, second time delay means adapted to be advanced a predetermined amount by closing movement of said contacts, said second time delay means normally maintaining said first time delay means disengaged from said quick acting means but permitting said engagement when advanced, and normally inactive means for maintaining said contacts separated having a part positioned to be engaged by a part advanced by advancement of said second time delay means to render said normally inactive means active to maintain said contacts separated in response to a predetermined number of successive circuit interrupting operations.

24. In a circuit interrupter, separable contact means, electromagnetic means for separating said contacts, means for automatically reclosing said contacts in response to a circuit interrupting operation, latch means movable in response to a first circuit interrupting operation to a position preventing a second succeeding separation of said contacts by said electromagnetic means, a bimetal controlled latch element maintaining said latch means in said position, and said bimetal latch element being responsive to predetermined circuit conditions to release said latch means and permit said electromagnetic means to again separate said contacts.

25. In a circuit interrupter, separable contacts, electromagnetic and bimetallic means responsive to predetermined circuit conditions for controlling separation of said contacts, means automatically closing said contacts in response to a circuit interrupting operation, means normally preventing control of contact separation by said bimetallic means, and means responsive to a first circuit interrupting operation under the control of said electromagnetic means for rendering said bimetallic means operative to control a second circuit interrupting operation.

26. In a circuit interrupter, separable contacts, electromagnetic and bimetallic means responsive to predetermined circuit conditions for controlling separation of said contacts, means automatically closing said contacts in response to a circuit interrupting operation, means normally preventing control of contact separation by said bimetallic means, means responsive to a first circuit interrupting operation under the control of said electromagnetic means for rendering said bimetallic means operative to control a second circuit interrupting operation, said bimetallic means deflecting to a non-controlling position when responding to said predetermined conditions, whereby a third successive circuit interrupting operation will be controlled by said electromagnetic means.

27. In a circuit interrupter, separable contacts, electromagnetic and bimetallic means responsive to predetermined circuit conditions for controlling separation of said contacts, means automatically closing said contacts in response to a circuit interrupting operation, means normally preventing control of contact separation by said bimetallic means, means responsive to a first circuit interrupting operation under the control of said electromagnetic means for rendering said bimetallic means operative to control a second circuit interrupting operation, and time delay means responsive to said first circuit interrupting operation for restoring said bimetallic means to its normal condition a predetermined time after reclosure of said contacts.

28. In a circuit interrupter, separable contacts, slidably mounted contact actuating means, electromagnetic means responsive to predetermined circuit conditions for moving said actuating means in a direction to separate said contacts, means for automatically reclosing said contacts in response to a circuit interrupting operation, a stop lug on said actuating means, a pivoted latch biased for movement to a position in the path of movement of said lug to prevent separation of said contacts by said electromagnetic means, means normally maintaining said latch outside the path of movement of said lug, said last-mentioned means being responsive to a circuit interrupting operation to permit movement of said latch to said position.

29. In a circuit interrupter, separable contacts, slidably mounted contact actuating means, electromagnetic means responsive to predetermined circuit conditions for moving said actuating means in a direction to separate said contacts, means for automatically reclosing said contacts in response to a circuit interrupting operation, a stop lug on said actuating means, a pivoted latch biased for movement to a position in the path of movement of said lug to prevent separation of and contacts by said electromagnetic means, means normally maintaining said latch outside the path of movement of said lug, said last-mentioned means being responsive to a circuit interrupting operation to permit movement of said latch to said position, a bimetal controlled latch member for maintaining said pivoted latch at said position, and said bimetal latch responsive to the continued existence of said predetermined circuit conditions to release said pivoted latch and permit said electromagnetic means to again separate said contacts.

30. In a circuit interrupter, separable contacts, electromagnetic means responsive to predetermined circuit conditions for separating said contacts, means automatically closing said contacts in response to a circuit interrupting operation, normally inactive bimetallic means, means responsive to a first circuit interrupting operation to render said bimetallic means capable of preventing a closely succeeding contact separating operation by said electromagnetic means, and said bimetallic means at least when preventing contact separation being also responsive to said predetermined circuit conditions to permit said electromagnetic means to effect a succeeding circuit interrupting operation, whereby such succeeding circuit interrupting operation will be delayed a predetermined time by said bimetallic means.

31. In a circuit interrupter, separable contacts, electromagnetic means responsive to predetermined circuit conditions for separating said contacts, means automatically closing said contacts in response to a circuit interrupting operation, normally inactive bimetallic means, means responsive to a first circuit interrupting operation to render said bimetallic means capable of preventing a closely succeeding contact separating operation by said electromagnetic means, said bimetallic means at least when preventing contact separation being also responsive to said predetermined circuit conditions to permit said electromagnetic means to effect a succeeding circuit interrupting operation, whereby such succeeding circuit interrupting operation will be delayed a predetermined time by said bimetallic means, and means for automatically resetting said bimetallic means to its inactive condition a predetermined time after a first circuit interrupting operation so that in the event the succeeding circuit interrupting operation does not closely succeed the first it will not be delayed by said bimetallic means.

32. In a circuit interrupter, separable contacts, electromagnetic means responsive to predetermined circuit conditions for separating said contacts, means automatically closing said contacts in response to a circuit interrupting operation, normally inactive bimetallic means, means responsive to a first circuit interrupting operation to render said bimetallic means capable of preventing a closely succeeding contact separating operation by said electromagnetic means, said bimetallic means at least when preventing contact separation being also responsive to said predetermined circuit conditions to permit said electromagnetic means to effect a succeeding circuit interrupting operation, whereby such succeeding circuit interrupting operation will be delayed a predetermined time by said bimetallic means, and said bimetallic means deflecting to an inactive position when responding to said predetermined conditions, so that said electromagnetic means may effect a third circuit interrupting operation without delay.

33. The combination of a circuit breaker, overload-responsive means for automatically and instantaneously opening the breaker, means responsive to an opening of the breaker for automatically reclosing the breaker, auxiliary means for directly restraining a further automatic opening by said overload-responsive means for a predetermined time interval in response to a predetermined reclosing operation, and means for removing said restraint after said time interval.

34. In an automatic reclosing circuit breaker, separable contacts, a single means for causing separation of said contacts to open the circuit, said contact separating means being responsive to a predetermined circuit condition for causing a relatively quick separation of said contacts, means responsive to a circuit interrupting operation to automatically close said contacts, and means automatically responsive to a predetermined circuit opening and reclosing operation for delaying the next succeeding circuit opening operation by said contact separating means for a predetermined time after the circuit is closed so that if said condition still exists said next opening of the circuit will be delayed.

35. In a circuit interrupter, separable contact means, electromagnetic means for causing separation of said contacts, means for automatically reclosing said contacts in response to a circuit interrupting operation, normally inactive time delay means, means responsive to a predetermined circuit interrupting operation for rendering said time delay means active to control movement of said electromagnetic means and thereby delay an attempted closely successive circuit interrupting operation at least for a predetermined time following a first reclosure of said contacts.

36. The combination of a circuit breaker, overload-responsive means for automatically and instantaneously opening the breaker, means responsive to an opening of the breaker for automatically reclosing the breaker, auxiliary means for directly mechanically restraining a further automatic opening by said overload-responsive means for a predetermined time interval in response to a predetermined reclosing operation.

37. In a circuit interrupter, separable contact means, electromagnetic means for causing separation of said contacts, means for automatically reclosing said contacts in response to a circuit interrupting operation, time delay means, means responsive to a predetermined circuit opening and closing of said interrupter to render said time delay means effective to delay movement of said electromagnetic means and thereby delay an attempted successive circuit interrupting operation, and said last mentioned means being biased to slowly return to a position at which said time delay means is rendered ineffective to delay movement of said electromagnetic means, whereby movement of said electromagnetic means will be delayed by said time delay means only in the event said electromagnetic means attempts to interrupt the circuit within a predetermined time following said predetermined opening and reclosing operation.

38. In a circuit interrupter, separable contact means, electromagnetic means for causing separation of said contacts, means for automatically reclosing said contacts in response to a circuit interrupting operation, time delay means, means adapted to be advanced a predetermined amount in response to a circuit opening and reclosing operation of said interrupter, means responsive to advancement of said operation responsive means a predetermined amount to render said time delay means effective to delay movement of said electromagnetic means and thereby delay an attempted successive circuit interrupting operation, said operation responsive means being biased to return to a position wherein said time delay means is inactive, and second time delay means for delaying return movement of said operation responsive means, whereby movement of said electromagnetic means will be delayed by said time delay means only in the event said electromagnetic means attempts to interrupt the circuit within a predetermined time following said predetermined opening and reclosing operation.

39. In a circuit interrupter, separable contact means, electromagnetic means for causing separation of said contacts, means for automatically reclosing said contacts in response to a circuit interrupting operation, time delay means, integrating means adapted to be advanced a predetermined amount in response to a circuit opening and reclosing operation of said interrupter, means responsive to advancement of said integrating means a predetermined amount to render said time delay means effective to delay movement of said electromagnetic means and thereby delay an attempted successive circuit interrupting operation, said integrating means being biased to return to a position wherein said time delay means is inactive, second time delay means for delaying return movement of said integrating means, whereby movement of said electromagnetic means will be delayed by said time delay means only in the event said electromagnetic means attempts to interrupt the circuit within a predetermined time following said predetermined opening and reclosing operation, and means responsive to a predetermined greater advancement of said integrating means to prevent reclosing of said contacts.

40. In a circuit interrupter, separable contact means, electromagnetic means for causing separation of said contacts, means for automatically reclosing said contacts in response to a circuit interrupting operation, time delay means, second time delay means for delaying reclosing movement of said contacts and having an element adapted to be advanced a predetermined amount in response to a circuit reclosing operation of said interrupter, means responsive to advancement of said element a predetermined amount to render said first mentioned time delay means effective to delay movement of said electromagnetic means and thereby delay an attempted successive circuit interrupting operation.

41. The combination of a circuit breaker, overload-responsive means for automatically and instantaneously opening the breaker, means responsive to an opening of the breaker for automatically reclosing the breaker, auxiliary means for directly mechanically restraining a further automatic opening by said overload-responsive means for a predetermined time interval in response to a predetermined reclosing operation comprising one means controlled by operation of said circuit breaker for locking said circuit breaker in the closed position, and means for restoring said locking means to unlocked condition after a predetermined time delay in the event said overload-responsive means is not energized sufficiently to effect another circuit opening operation.

42. In a circuit interrupter, separable contact means, electromagnetic means for separating said contacts, means for automatically reclosing said contacts in response to a circuit interrupting operation, a member associated with said contacts and movable therewith, an interference member biased to move in response to a predetermined circuit interrupting operation to one position where it is in the path of opening movement of said first-mentioned member for preventing a closely succeeding separation of said contacts under the influence of said electromagnetic means, and timing means normally holding said interference member out of the path of movement of said first-mentioned member and including a ratchet and gear train operatively connected to said interrupter and arranged in response to said predetermined operation to release said interference member for movement to its aforesaid one position, and said timing means being responsive to operation of said contacts for moving said interference member away from said one position a predetermined time after reclosure of said contacts in the event said electromagnetic means is not energized sufficiently to attempt another circuit opening operation.

43. In a circuit interrupter, separable contact means, electromagnetic means for separating said contacts, means for automatically reclosing said contacts in response to a circuit interrupting operation, a member associated with said contacts and movable therewith, an interference member biased to move in response to a predetermined circuit interrupting operation to one position where it is in the path of opening movement of said first-mentioned member for preventing a closely succeeding separation of said contacts under the influence of said electromagnetic means, and timing means normally holding said interference member out of the path of movement of said first-mentioned member and including a ratchet and gear train operatively connected to said interrupter and arranged in response to said predetermined operation to release said interference member for movement to its aforesaid one position, and said timing means including a resetting spring so as to be responsive to operation of said contacts for moving said interference member away from said one position a predetermined time after reclosure of said contacts in the event said electromagnetic means is not energized sufficiently to attempt another circuit opening operation.

44. In a circuit interrupter, separable contact means, electromagnetic means for separating said contacts, means for automatically reclosing said contacts in response to a circuit interrupting operation, a member associated with said contacts and movable therewith, an interference member biased to move in response to a predetermined circuit interrupting operation to one position where it is in the path of opening movement of said first-mentioned member for preventing a closely succeeding separation of said contacts under the influence of said electromagnetic means, and timing means normally holding said interference member out of the path of movement of said first-mentioned member and including a ratchet and gear train operatively connected to said interrupter and arranged in response to said predetermined operation to release said interference member for movement to its aforesaid one position, and said timing means including a resetting spring and delay means so as to be responsive to operation of said contacts for moving said interference member away from said one position a predetermined time after reclosure of said contacts in the event said electromagnetic means is not energized sufficiently to attempt another circuit opening operation.

45. The combination of a circuit breaker, overload-responsive means for automatically and instantaneously opening the breaker, means responsive to an opening of the breaker for automatically reclosing the breaker, auxiliary mechanical locking means for directly restraining a further automatic opening by said overload-responsive means for a predetermined time interval in response to a predetermined reclosing operation.

46. The combination of a circuit breaker, overload-responsive means for automatically and instantaneously opening the breaker, means responsive to an opening of the breaker for automatically reclosing the breaker, auxiliary means for directly restraining a further automatic opening by said overload-responsive means for a predetermined time interval in response to a predetermined reclosing operation, comprising a mechanical lock for preventing an instantaneous automatic circuit opening operation by said overload-responsive means, holding means for normally rendering said mechanical lock inoperative, and means responsive to a predetermined opening and reclosing operation of said breaker for releasing said holding means to render said lock operative.

47. The combination of a circuit breaker of the reclosing type comprising two contacts normally in engagement, overload-responsive means comprising an electromagnet having a winding connected in series with said contacts for automatically and instantaneously opening the breaker by moving one of said contacts out of engagement with the other contact when the current through said series-connected winding and contacts exceeds a predetermined value, means responsive to an opening of the breaker for automatically moving said one contact into engagement with the other of said contacts when said winding is deenergized for automatically reclosing the breaker, timing means actuated by said one of said contacts during the closing operation thereof for retarding said closing operation, auxiliary means controlled by said timing means for directly mechanically restraining a further automatic opening by said overload-responsive means for a predetermined time interval in response to a predetermined reclosing operation when the current through said series-connected winding is below said predetermined value.

48. The combination of a circuit breaker, overload-responsive means for automatically and instantaneously opening the breaker, means responsive to an opening of the breaker for automatically reclosing the breaker, auxiliary means for directly restraining a further automatic opening by said overload-responsive means for a predetermined time interval in response to a predetermined reclosing operation, comprising means for delaying closing movement of said contacts including an actuating member adapted to be advanced a predetermined amount by each operation of said reclosing means, movable stop means movable in response to predetermined advancement of said member for preventing operation of said contact separating means to open said contacts, and means for slowly returning said member to its original position to restore said stop means to its original position a predetermined time after advancement of said member.

HERBERT L. RAWLINS.
JAMES M. WALLACE.

REFERENCES CITED

The following references are of record in the file of this patent:

UNITED STATES PATENTS

| Number | Name | Date |
|---|---|---|
| 2,414,786 | Lincks et al. | Jan. 21, 1947 |